(12) United States Patent
Schumacher et al.

(10) Patent No.: US 10,660,267 B2
(45) Date of Patent: May 26, 2020

(54) KNIFE ATTACHMENT ARRANGEMENT FOR MOWER KNIVES DRIVEN IN AN OSCILLATING MANNER

(71) Applicant: EWM EICHELHARDTER WERKZEUG- UND MASCHINENBAU GMBH, Eichelhardt (DE)

(72) Inventors: Heinrich Gunter Schumacher, Eichelhardt (DE); Jochen Heinemann, Obererbach (DE)

(73) Assignee: EWM EICHELHARDTER WERKZEUG- UND MASCHINENBAU GMBH, Eichelhardt (DE)

( * ) Notice: Subject to any disclaimer, the term of this patent is extended or adjusted under 35 U.S.C. 154(b) by 260 days.

(21) Appl. No.: 15/575,627

(22) PCT Filed: May 12, 2016

(86) PCT No.: PCT/EP2016/060745
§ 371 (c)(1),
(2) Date: Nov. 20, 2017

(87) PCT Pub. No.: WO2016/188769
PCT Pub. Date: Dec. 1, 2016

(65) Prior Publication Data
US 2018/0153097 A1 Jun. 7, 2018

(30) Foreign Application Priority Data

May 22, 2015 (DE) .................. 10 2015 108 108

(51) Int. Cl.
*A01D 34/34* (2006.01)
*A01D 34/30* (2006.01)

(52) U.S. Cl.
CPC ............. *A01D 34/34* (2013.01); *A01D 34/30* (2013.01)

(58) Field of Classification Search
CPC ...... A01D 34/145; A01D 34/30; A01D 34/32; A01D 34/33; A01D 34/34; Y10T 74/2173
(Continued)

(56) References Cited

U.S. PATENT DOCUMENTS 502,794 A * 8/1893 Warner .................. F16C 11/02
74/595
1,579,969 A * 4/1926 Teel ........................ A01D 34/30
74/595

(Continued)

FOREIGN PATENT DOCUMENTS

DE 244 903 A1 4/1987
DE 10 2004 037 580 A1 3/2006
(Continued)

OTHER PUBLICATIONS

International Search Report for PCT/EP2016/060745 dated Aug. 9, 2016 [PCT/ISA/210].
(Continued)

*Primary Examiner* — Alicia Torres
*Assistant Examiner* — Adam J Behrens
(74) *Attorney, Agent, or Firm* — Sughrue Mion, PLLC

(57) ABSTRACT

A Knife attachment arrangement for oscillatingly driven mower knives, including a shaft (1) defining a first longitudinal axis (X) and having a receiving space (4) and a mower knife drive pin (2) engaging in the receiving space (4) and being detachably connected to the shaft (1). A head bearing holding area (13) of the mower knife drive pin (2) engages in the receiving space (4) and has a first contact face (14) that is in contact with the first support face (6) and is curved opposite to the first support face (6). An undercut (8)

(Continued)

is formed in the wall (5) delimiting the receiving space (4) and the head bearing holding area (13) of the mower knife drive pin (2) has a collar (16) engaging in the undercut (8), wherein the undercut is formed as a groove (8) in the wall (5), the groove (8) extends radially with respect to the second longitudinal axis (Y).

15 Claims, 5 Drawing Sheets

(58) Field of Classification Search
USPC ...... 30/42, 44, 34.05, 43.4, 272.1, 392, 393, 30/371, 388; 74/59, 25, 595; 83/666, 83/698.41
See application file for complete search history.

(56) References Cited

U.S. PATENT DOCUMENTS

| | | | |
|---|---|---|---|
| 1,657,419 A * | 1/1928 | Teel | A01D 34/30 74/595 |
| 4,446,683 A * | 5/1984 | Rempel | A01D 34/13 56/16.2 |
| 4,813,291 A * | 3/1989 | Schumacher, II | A01D 34/30 384/434 |
| 5,622,035 A | 4/1997 | Kondo et al. | |
| 7,401,458 B2 * | 7/2008 | Priepke | A01D 34/145 56/296 |
| 7,708,664 B2 * | 5/2010 | Schumacher | A01D 34/30 475/11 |
| 2007/0087891 A1 | 4/2007 | Schumacher et al. | |
| 2009/0107288 A1 | 4/2009 | Gil et al. | |

FOREIGN PATENT DOCUMENTS

| | | | |
|---|---|---|---|
| EP | 1 772 051 A1 | 4/2007 | |
| EP | 2 700 293 A2 | 2/2014 | |
| GB | 428683 A * | 5/1935 | ............ A01D 34/32 |
| RU | 2 346 424 C2 | 2/2009 | |
| WO | 2013/053351 A1 | 4/2013 | |

OTHER PUBLICATIONS

Communication dated Nov. 26, 2019, issued by the Intellectual Property of India in corresponding Application No. 201747041480.

* cited by examiner

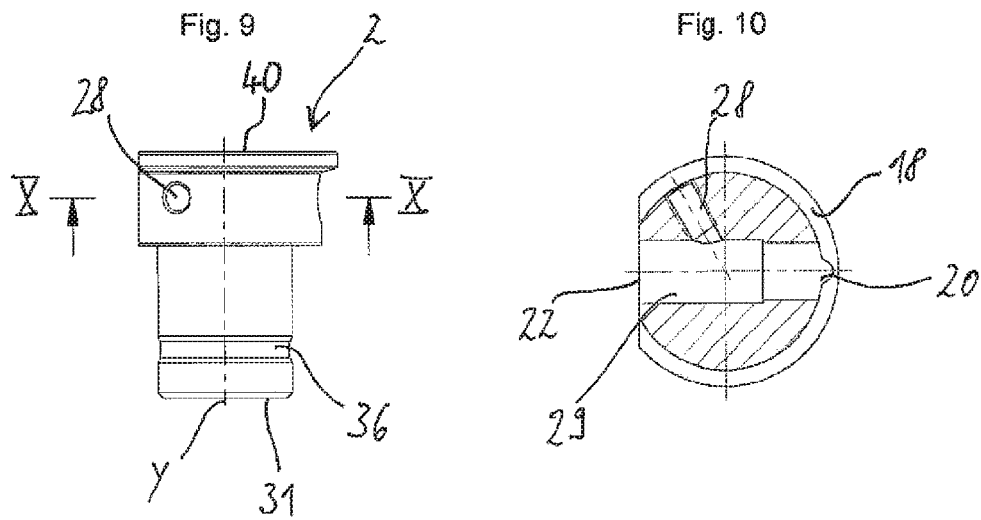
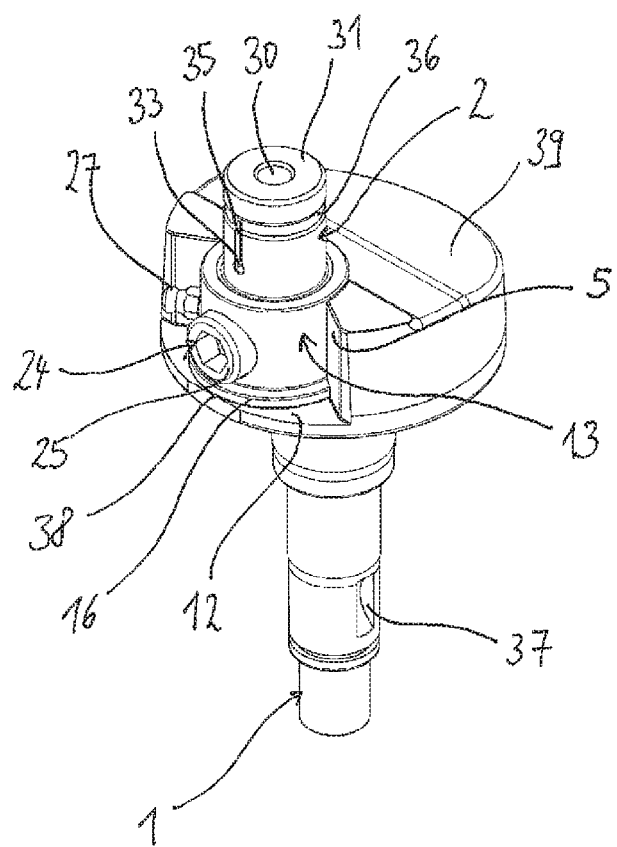

US 10,660,267 B2

KNIFE ATTACHMENT ARRANGEMENT FOR MOWER KNIVES DRIVEN IN AN OSCILLATING MANNER

CROSS REFERENCE TO RELATED APPLICATIONS

This application is a National Stage of International Application No. PCT/EP2016/060745, filed on May 12, 2016, which claims priority from German Patent Application No. 10 2015 108 108.3, filed on May 22, 2015, the contents of all of which are incorporated herein by reference in their entirety.

BACKGROUND OF THE INVENTION

Field of the Invention

The present invention relates to a knife attachment arrangement for oscillatingly driven mower knives, comprising a shaft defining a first longitudinal axis and having a receiving space; a mower knife drive pin engaging in the receiving space and being detachably connected to the shaft, the mower knife drive pin extends axially with respect to the first longitudinal axis beyond the shaft and defining a second longitudinal axis being radially offset with respect to the first longitudinal axis, wherein a wall of the shaft that delimits the receiving space has a first support face curved in the circumferential direction, and wherein a head bearing holding area of the mower knife drive pin engages in the receiving space and has a first contact face that is in contact with the first support face and is curved opposite to the first support face; and having connecting means for detachable connection of the mower knife drive pin to the shaft.

Background

DE 10 2004 037 580 A1 shows a knife attachment arrangement for oscillatingly driven mower knives. The known knife attachment arrangement has a crankshaft, on which longitudinal end arranged outside of a transmission housing a receiving space is provided for the detachable accommodation of a mower knife drive pin. The mower knife drive pin has a U-formed head bearing holding area at a longitudinal end portion engaging in the receiving space. The two legs of the head bearing holding area are connected, respectively, via a screw connection to the shaft. By means of this lay-out two screws have to be used to press the mower knife drive pin in the area of the head bearing holder against the shaft. Because of the high component diversity, an assembly or disassembly of the mower knife drive pin involves increased efforts.

From DD 244 903 A1 a double crank for mowers for driving the mower knives is known. A first crank pin has a cylindrical projection, formed in axial direction, and a profiled projection, the projections are clamped in a receiving bore of an inertia mass, formed counter-fittingly. For clamping the crank pin, the inertia mass has a slot extending through the receiving bore and a clamping screw arranged transversally thereto.

Therefore, an object of the present invention is to provide a knife attachment arrangement which can be easily mounted and is maintenance friendly.

This object is met according to the invention by a knife attachment arrangement for oscillatingly driven mower knives of the above named type such, that a wall of the shaft, delimiting the receiving space, has a first support face curved in circumferential direction, and that a head bearing holding area of the mower knife drive pin engaging in the receiving space has a first contact face contacting the first support face and curved opposite to the first support face. In the wall delimiting the receiving space an undercut is formed and the head bearing holding area of the mower knife drive pin has a collar engaging in the undercut. Furthermore, this undercut is formed like a groove extending radially in respect to the second longitudinal axis in the wall.

The invention is based on the consideration that the knife attachment arrangement can be part of the mower knife drive in the assembled condition, in which a rotary movement is converted into a translatory reciprocating movement. During operation of the mower knife drive, the mower knife drive pin then rotates around the first longitudinal axis of the shaft. At a free longitudinal end portion of the mower knife drive pin, i.e. facing away from the shaft, a mower knife is usually arranged in the assembled condition, which is oscillatingly driven by the reciprocating movement.

SUMMARY OF THE INVENTION

According to the invention, the mower knife drive pin, rotating during operation around the first longitudinal axis, is supported with a curved first contact face on a shaft's first support face being curved opposite. When the knife arrangement is assembled in a mower knife drive a mower knife can be held at a free longitudinal end portion of the mower knife drive pin, which mower knife is reciprocatingly moved along the movement axis. Thus, during operation of the mower knife drive, due to the rotation of the mower knife drive pin in circumferential direction the mower knife from different radial directions affects the free longitudinal end portion of the mower knife drive pin, whereby transversal forces act on the head bearing holding area, i.e. the longitudinal end portion of the mower knife drive pin that engages in the receiving space. Because of the acting transversal forces the curved first contact face is pressed in a surface to surface manner against the opposite curved first support face. In contrast to a straight support face or contact face, in which the bearing pressure between the two faces is only then at a maximum when the transversal forces act vertically to the support face or contact face on the head bearing holding area the bearing pressure of the knife attachment arrangement according to the invention is at a maximum across a larger continuous circumferential portion. In this manner it is ensured that the mower knife drive pin is supported along the circumference of the first support face on the wall of the receiving space. Thus, an improved contact pressure is achieved between the head bearing holding area of the mower knife drive pin and the crankshaft.

Furthermore, because of this lay-out, the surface contact between the mower knife drive pin in the area of the head bearing holding area and the wall of the shaft is additionally increased. As the mower knife engages on the free longitudinal end portion of the mower knife drive pin a tilting torque is generated because of the lever arm. The tilting torque can be absorbed by the undercut and the engaging collar.

Thus, the collar engages in the groove of the wall vertically in respect to the second longitudinal axis and therefore parallel to the engagement direction of the mower knife, affecting the free longitudinal end portion of the mower knife drive pin, whereby the mower knife drive pin is supported vertically to the lever arm on the wall. In particular, the groove extends semi-circular around the second longitudinal axis. In principle, the wall can also have several grooves being distributed along the circumference and extending in circumferential direction, wherein accordingly several collar portions can be provided along the head bearing holding area, which collar portions engage in the respective grooves.

Furthermore, the first support face can be curved concavely and the first contact face can be curved convexly. In this manner, the mower knife drive pin can be formed in the area of the first contact face at least in sections cylindrical. In particular, a cross-section of the first support face and a cross-section of the first contact face can, respectively, be formed partially circular around a centre point arranged on the second longitudinal axis. Because of the partial circular lay-out around the second longitudinal axis, an especially good support of the mower knife drive pin can be achieved in circumferential direction on the shaft's wall delimiting the receiving space.

Furthermore, the first support face and the first contact face can be aligned parallel to the second longitudinal axis. Thus, the transversal forces produced by the mower knife act vertically on the first support face and/or the first contact face. Preferably, the first support face formed partially circular in cross-section and the first contact face formed partially circular in cross-section can be formed cylindrical in respect to the second longitudinal axis at least along a part of the circumference.

According to an aspect of the present invention, the connection means have a screw, which engages through a first bore, formed at the top bearing holding portion of the mower knife drive pin, in a second bore formed in the wall. In a preferred manner, the mower knife drive pin is tightened with exactly one screw to the wall of the shaft. Because of the curved design of the first support face and the first contact face such a high contact pressure is produced between the two faces and the mower knife drive pin is supported on the wall of the shaft in such an advantageous manner, that the mower knife drive pin can be screwed with only one single fastener, for example a screw or a threaded nut for a stud, securely and retainable to the wall. Thus, the component diversity of the knife attachment arrangement is reduced. Furthermore, the knife attachment arrangement is easy to assemble and maintenance-friendly, as the mower knife drive pin can be exchanged and/or mounted by means of detaching and/or tightening of only one single screw.

Furthermore, the first bore of the mower knife drive pin and the second bore of the wall can be formed radially to the second longitudinal axis. Preferably, a first opening of the first bore is formed in the first contact face of the mower knife drive pin and a second opening of the second bore is formed in the first support face of the wall. Thus, the first contact face and the first support face are pressed onto one another additionally by the screw.

Furthermore, the mower knife drive pin can have in the head bearing holding area an abutment face, extending parallel to the second or extending parallel to the first longitudinal axis, wherein a third opening of the first bore is formed in the abutment face. The first bore of the mower knife drive pin is, thus, formed as a through bore, through which the connections means, especially the screw, extends. In this manner, the connection means can be inserted or removed in an easy manner. Because of the straight, i.e. not curved, abutment face, the connection means, especially a screw head of the screw, can affect in a face to face manner the abutment face and can press the mower knife drive pin against the wall. In particular, the third opening is arranged diametrically in respect to the first opening at the head bearing holding area of the mower knife drive pin. In this manner the radial contact pressure between the first support face and the first contact face is increased.

Furthermore, it can be provided that the collar is formed on a longitudinal end of the head bearing holding area of the mower knife drive pin engaging in the receiving space. Thus, the mower knife drive pin is particularly well supported on the wall of the shaft.

Furthermore, the wall may have a second support face, arranged inclined in respect to the first support face, between a wall portion of the wall radially delimiting the undercut, and the first support face, and the mower knife drive pin may have between a collar face, radially delimiting the collar, and the first contact face a second contact face, arranged parallel to the second support face and contacting the second support face. Thus, the undercut is formed at least approximately conical. Because of the second support face of the wall, which is arranged inclined, i.e. not parallel to the first support face, the mower knife drive pin is pressed upon mounting of the connection means in the area of the collar against the collar face, whereby the contact pressure between the mower knife drive pin and the wall of the shaft is additionally improved.

Preferably, the first support face is arranged coaxially to the second longitudinal axis and is formed like a circular cylindrical portion. This means that the first support face is arranged on an envelope face of an imaginary circular cylindrical portion, i.e. extends only along a part of the circumference around the second longitudinal axis.

Preferably, the second support face is also arranged coaxially to the second longitudinal axis and is formed like a truncated cone portion. This means that the second support face is arranged on an envelope face of an imaginary truncated cone portion, i.e. extends also only along a portion of the circumference around the second longitudinal axis. In a special lay-out, the second support face encloses a cone angle of 130° to 170°, preferably of 150°. In other words, the second support face encloses with the second longitudinal axis and/or with the first support face an angle of 95° to 115°, preferably of 105°.

Preferably, the angle between the first support face and the second support face is identical to the angle between the first contact face and the second contact face. Thus, the mower knife drive pin is additionally pressed during the connection by means of the connection means against a bottom plate of the shaft delimiting the receiving space.

Preferably, the mower knife drive pin is held with an end face arranged transversally to the second longitudinal axis, in contact to a bottom plate of the shaft delimiting the receiving space. Because of the second support face, formed at an angle to the bottom plate, the mower knife drive pin is pressed against the bottom plate during the pressing of the second contact face against the second support face, whereby a clamping of the mower knife drive pin in the receiving space and an improved support of the tilting forces is achieved.

In particular, the shaft is a crankshaft, which engages in particular in a rotor shaft of a gearing. The gearing can for example be an angular gear with input shaft and output shaft arranged at an angle to each other or a linear gear with input shaft and output shaft arranged parallel to each other, which is designed for the oscillating drive of a mower knife.

BRIEF DESCRIPTION OF THE DRAWINGS

Preferred Embodiments of the Invention are Shown in the Drawings and are Described in the Following. Herein it Shows:

FIG. 9 the mower knife drive pin in a further side view;

FIG. 10 the mower knife drive pin in a sectional view along the line X-X shown in FIG. 9; and FIG. 11 the mower knife attachment arrangement according to a second embodiment of the present invention.

DETAILED DESCRIPTION OF THE INVENTION

Figure 1:
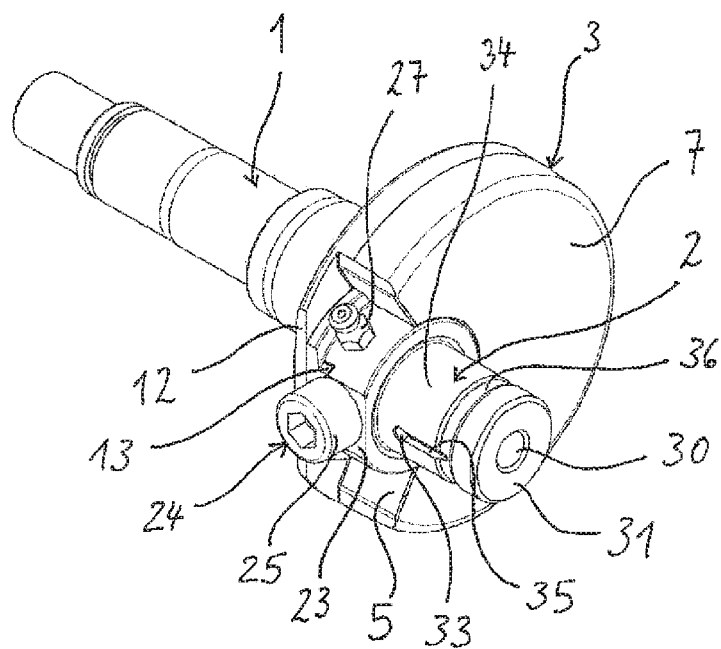
FIG. 1 a mower knife attachment arrangement according to a first embodiment of the present invention in a perspective view.
Figure 2:
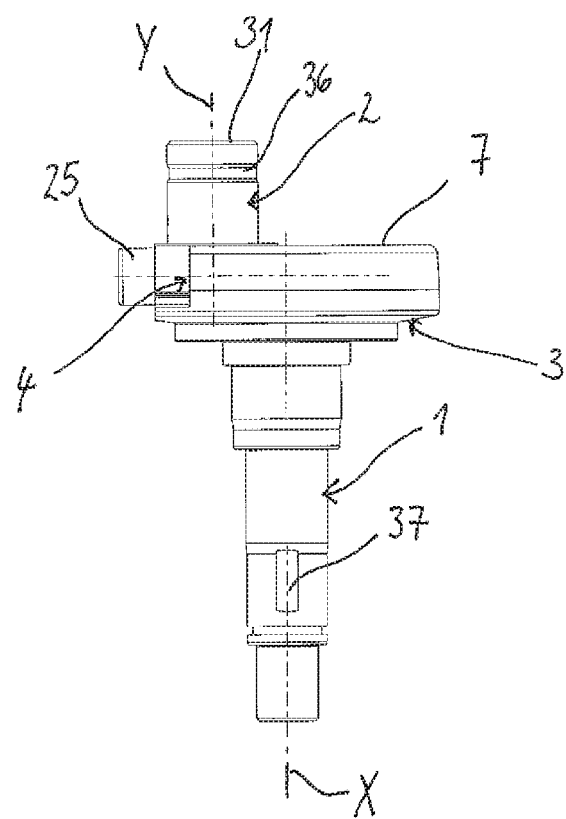
FIG. 2 the mower knife attachment arrangement of FIG. 1 in a side view.

In FIGS. 1 and 2, a mower knife attachment arrangement according to a first embodiment of the present invention is shown. The mower knife attachment arrangement can be part of a mower knife drive for oscillatingly driving a mower knife of an agricultural machine, both not shown. The mower knife attachment arrangement has a crankshaft 1 and a mower knife drive pin 2 non-rotationally connected to the crankshaft 1.

Figure 3:
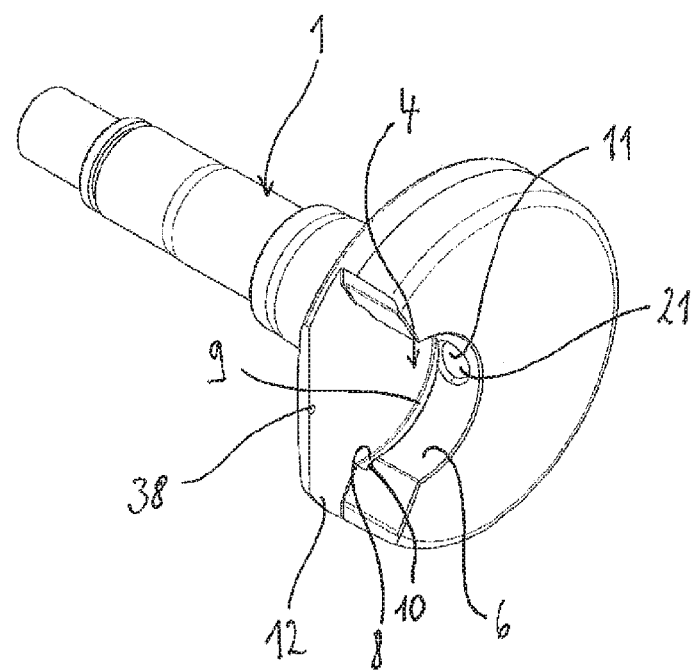
FIG. 3 a crankshaft of the mower knife attachment arrangement of FIG. 1 in a perspective view.
Figure 4:
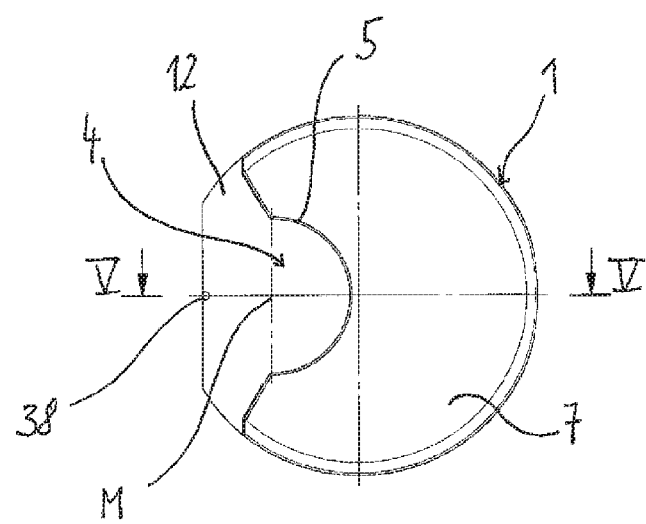
FIG. 4 the crankshaft in a top view.
Figure 5:
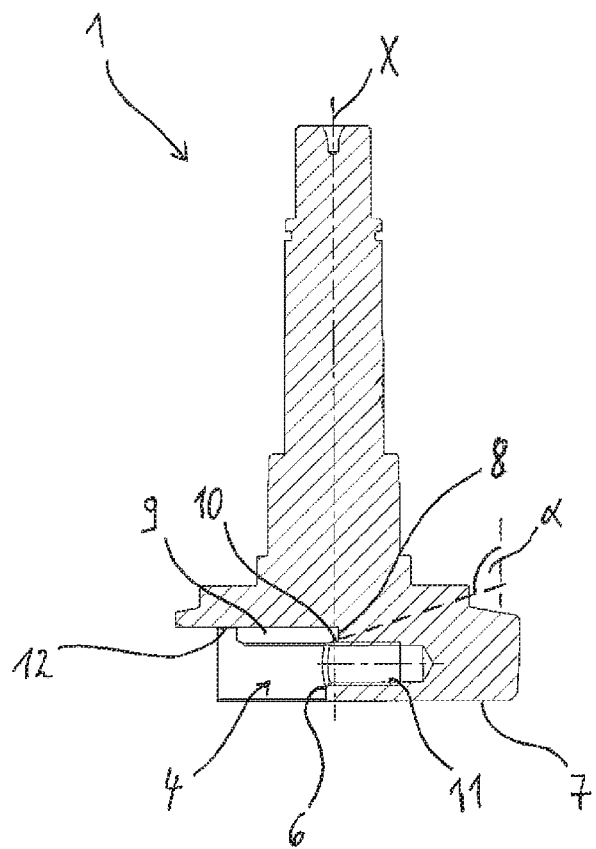
FIG. 5 the crankshaft in a sectional view along the line V-V shown in FIG. 4.
Figure 6:
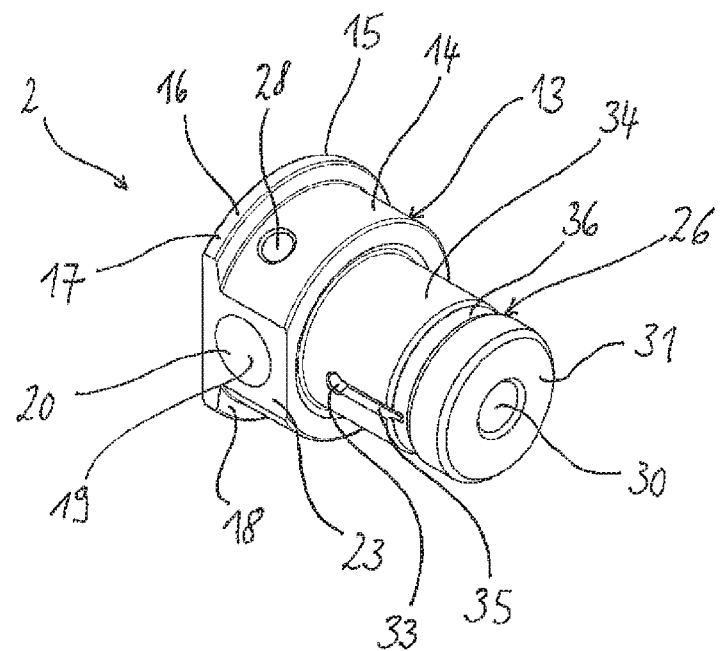
FIG. 6 a mower knife drive pin of the mower knife attachment arrangement of FIG. 1 in a perspective view.
Figure 7:
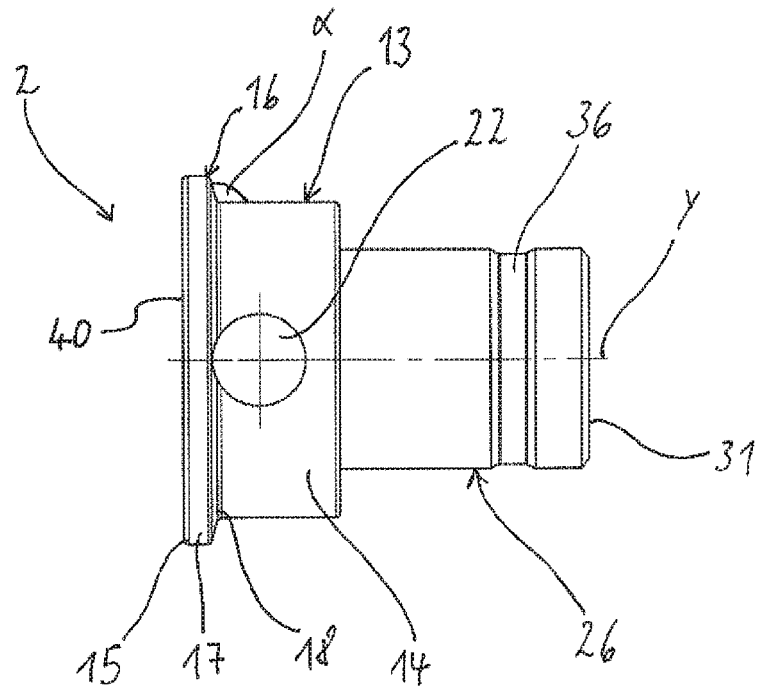
FIG. 7 the mower knife drive pin in a side view.
Figure 8:
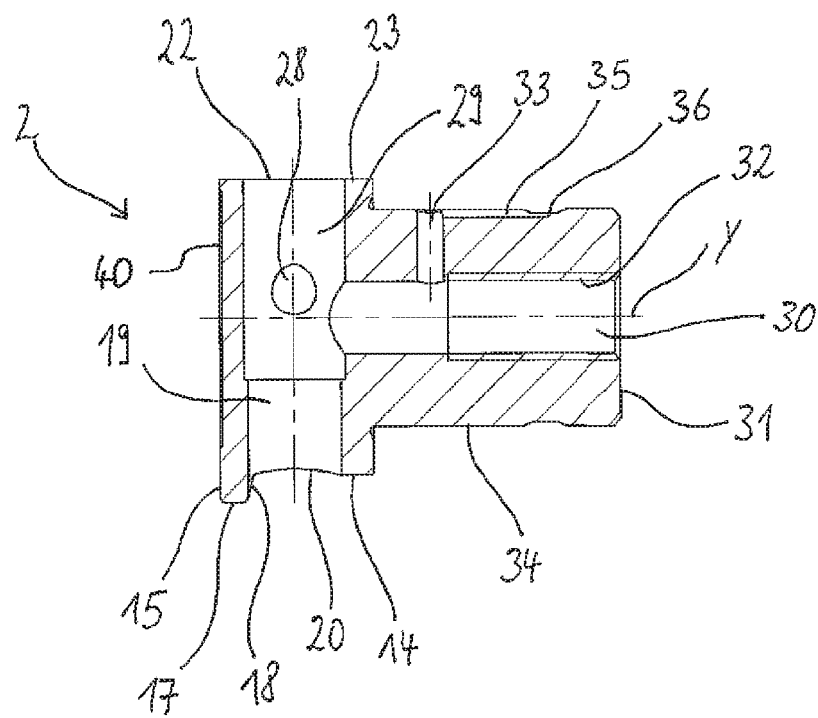
FIG. 8 the mower knife drive pin in a side view.

In FIGS. 3 to 5, the crankshaft 1 is shown detached from the mower knife drive pin 2. The crankshaft 1 defines a first longitudinal axis X, around which the crankshaft 1 rotates during operation of the mower knife attachment arrangement. FIG. 3 shows that the crankshaft 1 has in a first longitudinal end portion 3 a receiving space 4, which is laterally delimited by a wall 5 formed semi-circular in cross-section. A centre point M of the wall 5 (shown in FIG. 4), being formed semi-circular in cross-section, is arranged on a second longitudinal axis Y radially off-set to the first longitudinal axis X. The wall 5 has a concavely curved first support face 6, which extends parallel to the second longitudinal axis Y and is also arranged in cross-section semi-circular around the centre point M. In axial direction, the first support face 6 is delimited by a first front side 7 of the crankshaft 1 and an undercut 8 provided in the wall 5. The undercut is formed as a groove extending radially relative to the second longitudinal axis Y in the wall 5. Between a wall portion 9 of the wall 5, delimiting radially the undercut 8, and the first support face 6, a second support face 10 arranged inclined relative to the first support face 6 is provided. Precisely, the first support face 6 and the second support face 10 are arranged inclined to each other and form an angle α of 105°. The first support face 6 is arranged coaxially to the second longitudinal axis Y and is formed like a circular cylindrical portion, and is thus arranged on an envelope face of an imaginary circular cylinder. The first support face 6 is, therefore, aligned parallel to the second longitudinal axis Y. The second support face 10 is arranged coaxially to the second longitudinal axis Y and is formed like a truncated cone portion, wherein the second support face 10 has a cone angle of 150°, and expressed in other words, forms with the first support face 6 the angle α of 105°.

Furthermore, in particular FIGS. 3 and 5 show that in the support face 6, a threaded bore 11 (second bore) extending radially to the first longitudinal axis X with an internal thread is provided. On a lower side of the receiving space 4, facing away from the front side 7, the receiving space 4 is delimited by a plate-like bottom plate 12. The bottom plate 12 has, when seen in cross-section, a circular face, wherein a portion of the bottom plate 12 arranged distanced from the wall 5 is cut from the circular face. Thus, the receiving space 4 is delimited downwards by the bottom plate 12 and laterally by the semi-circular wall 5, whereby the receiving space 4 is designed open laterally, i.e. radially to the second longitudinal axis Y and at the front side 7 of the crankshaft 1.

In FIGS. 6 to 10, the mower knife drive pin 2 is shown detached from the crankshaft 1. The mower knife drive pin 2 engages with a head bearing holding area 13 in the receiving space 4 of the crankshaft 1, wherein the mower knife drive pin 2 extends in the inserted condition, shown in FIGS. 1 and 2, axially relative to the first longitudinal axis X beyond the crankshaft 1. The mower knife drive pin 2 defines the second longitudinal axis Y, radially off-set to the first longitudinal axis X, on which also the in FIG. 4 highlighted centre point M of the semi-circular wall 5 is arranged. The head bearing holding area 13 has a first contact face 13, curved opposite to the first support face 6 and which contacts the first support face 6 in a surface to surface manner. Correspondingly to the concavely curved first support face 6, the first contact face 14 is curved convexly. The first contact face 14 extends parallel to the second longitudinal axis Y and extends, when seen in cross-section, partially circular around the centre point M arranged on the second longitudinal axis Y. At a longitudinal end 15 of the head bearing holding area 13 engaging in the receiving space 4, a collar 16 is formed, which extends in circumferential direction. The collar 16 engages in the inserted condition in the groove 8 of the wall 5 of the crankshaft 1. Furthermore, the head bearing holding area 13 has between a collar face 17, radially delimiting the collar 16, and the first contact face 14, a second contact face 18, arranged parallel to the second support face 10. The second contact face 18 abuts in a surface to surface manner the second support face 10. In a manner corresponding to the second support face 10, an angle of 105° is enclosed between the first contact face 14 and the second contact face 18.

Furthermore, in the head bearing holding area 13 of the mower knife drive pin 2, a through bore 19 (first bore), here of stepped configuration, is formed, which extends in the inserted condition, shown in FIGS. 1 and 2, radially to the second longitudinal axis Y. In detail, the mower knife drive pin 2 has in the first contact face 14 a first opening 20 of the through bore 19, which is arranged coaxially to a second opening 21 in the first support face 6 of the threaded bore 11 formed in the wall 5. Diametrically to the first opening 20, a third opening 22 for the through bore 19 is provided at the head bearing holding area 13. The third opening 22 is arranged within an abutment face 23, which extends parallel to the second longitudinal axis Y. The otherwise cylindrically formed head bearing holding area 13 is formed along the abutment face 23, extending axially up to the longitudinal end 15 of the mower knife drive pin 2, straight, i.e. not curved and ends in the inserted condition, shown in FIGS. 1 and 2, flush with the cut bottom plate 12. Thus, with exception of the straight abutment face 23, the mower knife drive pin 2 is formed with several cylindrical portions of different diameters, wherein the head bearing holding area 13 and especially the collar 16 have the portions with the largest diameters.

A connection means in form of a screw 24 engages through the through bore 19 in the threaded bore 11 of the wall 5. A screw head 25 of the screw 24 is supported on the abutment face 23, so that the mower knife drive pin 2, when tightening the screw 24, is pressed with the first contact face 14 against the support face 6 of the wall 5. Furthermore, the mower knife drive pin 2 is pressed while tightening the screw 24, by the inclined arranged second contact face 18, which abuts in a surface to surface manner the second support face 10, with an end face 40, facing the bottom plate 12, against the bottom plate 12. Thus, by means of a single screw 24, a secure and non-rotational connection is provided between the mower knife drive pin 2 and the crankshaft 1 with a high surface pressure. For the assembly and disassembly of the mower knife attachment arrangement, only the single screw has to be loosened in order to detach the mower knife drive pin 2 from the crankshaft 1 or to mount it on the crankshaft 1 back again.

Furthermore, the mower knife drive pin 2 has, in this case, a lubrication for a rolling member bearing, not shown here, which can be pushed onto a free longitudinal end portion 26 of the mower knife drive pin 2. If no lubrication is necessary, the through bore 19 can also be formed with a constant diameter, i.e. not stepped. For the lubrication, shown in detail in FIGS. 8 to 10, the mower knife drive pin 2 has a lubricating nipple 27, which is screwed into a bore 28 extending radially to the second longitudinal axis Y. The bore 28 is connected to the stepped through bore 19 along a portion 29 of the through bore 19, which has a maximal diameter. Coaxially relative to the second longitudinal axis Y, an axial bore 30 is provided in the mower knife drive pin 2, which axial bore 30 is formed at one end with the portion 29 of the through bore 19 and is open at the other end and ends in an end side 31 of the mower knife drive pin 2. At a free longitudinal end portion 26 of the mower knife drive pin 2, facing to the end side 30, an inner thread 32 is provided in the axial bore 30, by means of which inner thread 32 the rolling member bearing, not shown, is screwed to the mower knife drive pin 2. Below the inner thread 32 of the axial bore 30, a radially extending lubricating bore 33 is provided, which ends in an outer face 34 of the mower knife drive pin 2, arranged radially externally, in an axially extending lubricating channel 35. The lubricating channel 35 extends up to an annular groove 36, formed into the outer side 34.

During the operation of the mower knife attachment arrangement according to the invention, the mower knife attachment arrangement is usually part of a mower knife drive, not shown, by which a rotary movement is transformed into a translatory reciprocating movement. For this, the crankshaft 1 can, for example, engage in a rotor shaft of a gearing, wherein the crankshaft 1, shown here, has a groove 37 for the non-rotational connection of a spur wheel, not shown, by means of a tongue and groove connection. To be able to insert the spur wheel with the crankshaft 1 into a defined insertion position in the gearing, a marking 38 is provided on the bottom plate 12, which marking 38 aligns in the defined insertion position with a further marking provided on a gearbox housing. During the operation of such a mower knife drive, the mower knife drive pin 2 rotates around the first longitudinal axis X of the crankshaft 1. At the free longitudinal end portion 31 of the mower knife drive pin 1, usually the rolling member bearing is arranged, on which the mower knife can be held, which is driven oscillatingly during operation. For lubricating the rolling member bearing, the lubricating nipple is lubricated in known manner, wherein the lubricant is arranged at least along the portion 29 of the through bore 19 around the screw 24 and is guided via the axial bore 30 and the lubricating channel 35 and the annular groove 36 to the rolling member bearing.

In FIG. 11, a mower knife attachment arrangement according to a second embodiment of the present invention is shown, wherein the main design corresponds to the mower knife attachment arrangement shown in FIGS. 1 to 10. The same components are provided with the same reference numerals. The mower knife attachment arrangement according to the second embodiment is formed comparably more stable, because of which the wall 5 has a larger axial extension. So that the mower knives, not shown, do not contact the crankshaft 1 during operation, the front side 7 of the crankshaft 1 is inclined at the side 39 facing away from the receiving space 4. Furthermore, the in FIG. 11 shown mower knife attachment arrangement differs from the in FIGS. 1 to 10 shown mower knife attachment arrangement merely in the fact that the screw head 25 of the inserted screw 24 is sunk partially into the through bore 19. Thus, the head bearing holding area 13 is formed cylindrical along the whole circumference and the collar 16 is closed annularly. The bottom plate 12 is formed, in this case, over substantially the whole circumference circular, when seen in cross-section, wherein the bottom plate 12 is only formed flattened in the extension of the screw head 25.

REFERENCE NUMERALS LIST 1 crankshaft
2 mower knife drive pin
3 first longitudinal end portion
4 receiving space
5 wall
6 first support face
7 front side
8 groove
9 wall portion
10 second support face
11 threaded bore
12 bottom plate
13 head bearing holding area
14 first contact face
15 longitudinal end
16 collar
17 collar face
18 second contact face
19 through bore
20 first opening
21 second opening
22 third opening
23 abutment face
24 screw
25 screw head
26 longitudinal end portion
27 lubricating nipple
28 bore
29 portion
30 axial bore
31 front side
32 inner thread
33 lubricating bore
34 outer side
35 lubricating channel
36 annular groove
37 groove
38 marking
39 inclined face
40 front face α angle
M centre point
X first longitudinal axis
Y second longitudinal axis

The invention claimed is:

1. A knife attachment arrangement for oscillatingly driven mower knives, comprising
    a shaft defining a first longitudinal axis and having a receiving space;
    a mower knife drive pin engaging in the receiving space and being detachably connected to the shaft, the mower knife drive pin extends axially with respect to the first longitudinal axis beyond the shaft and defines a second longitudinal axis being radially offset with respect to the first longitudinal axis, wherein a wall of the shaft that delimits the receiving space has a first support face curved in a circumferential direction, and wherein a head bearing holding area of the mower knife drive pin engages in the receiving space and has a first contact face that is in contact with the first support face and is curved opposite to the first support face; and
    a connector for detachable connection of the mower knife drive pin to the shaft,
    wherein an undercut is formed in the wall delimiting the receiving space and the head bearing holding area of the mower knife drive pin has a collar engaging in the undercut,
    wherein the undercut is formed as a groove in the wall, the groove extends radially with respect to the second longitudinal axis, and
    wherein the connector comprises a screw, which protrudes through a first bore that is formed in a top bearing holding area of the mower knife drive pin into a second bore that is formed in the wall.

2. The knife attachment arrangement according to claim 1,
    wherein the first support face is concavely curved and that the first contact face is convexly curved.

3. The knife attachment arrangement according to claim 1,
    wherein a cross-section of the first support face and a cross-section of the first contact face are, respectively, arranged partially circular around a centre point that is arranged on the second longitudinal axis.

4. The knife attachment arrangement according to claim 1,
    wherein the first support face and the first contact face are aligned parallel to the second longitudinal axis.

5. The knife attachment arrangement according to claim 1,
    wherein the first bore of the mower knife drive pin and the second bore of the wall are aligned radially to the second longitudinal axis.

6. The knife attachment arrangement according to claim 1,
    wherein a first opening of the first bore is formed in the first contact face of the mower knife drive pin and that a second opening of the second bore is formed in the first support face of the wall.

7. The knife attachment arrangement according to claim 6,
    wherein the mower knife drive pin has in the head bearing holding area an abutment face extending parallel to the second longitudinal axis, wherein a third opening of the first bore is formed in the abutment face.

8. The knife attachment arrangement according to claim 7,
    wherein the third opening is arranged diametrically to the first opening on the head bearing holding area of the mower knife drive pin.

9. The knife attachment arrangement according to claim 1,
    wherein the collar is formed on a longitudinal end of the head bearing holding area of the mower knife drive pin engaging in the receiving space.

10. The knife attachment arrangement according to claim 1,
    wherein the wall has between a wall portion of the wall, delimiting radially the undercut, and the first support face a second support face arranged inclined to the first support face,
    and wherein the mower knife drive pin has between a collar face delimiting radially the collar and the first contact face a second contact face arranged parallel to the second support face and contacting the second support face.

11. The knife attachment arrangement according to claim 10,
    wherein the first support face is arranged coaxially to the second longitudinal axis and is formed like a circular cylindrical portion.

12. The knife attachment arrangement according to claim 10,
    wherein the second support face is arranged coaxially to the second longitudinal axis and is formed like a truncated cone portion.

13. The knife attachment arrangement according to claim 1,
    wherein the mower knife drive pin is held in abutment to a bottom plate delimiting the receiving space by an end face arranged transversally to the second longitudinal axis.

14. The knife attachment arrangement according to claim 12, wherein the second support face has a cone angle of 130° to 170°.

15. A knife attachment arrangement for oscillatingly driven mower knives, comprising
    a shaft defining a first longitudinal axis and having a receiving space;
    a mower knife drive pin engaging in the receiving space and being detachably connected to the shaft, the mower knife drive pin extends axially with respect to the first longitudinal axis beyond the shaft and defines a second longitudinal axis being radially offset with respect to the first longitudinal axis, wherein a wall of the shaft that delimits the receiving space has a first support face curved in a circumferential direction, and wherein a head bearing holding area of the mower knife drive pin engages in the receiving space and has a first contact face that is in contact with the first support face and is curved opposite to the first support face; and
    a connector for detachable connection of the mower knife drive pin to the shaft,
    wherein an undercut is formed in the wall delimiting the receiving space and the head bearing holding area of the mower knife drive pin has a collar engaging in the undercut,
    wherein the undercut is formed as a groove in the wall, the groove extends radially with respect to the second longitudinal axis, and
    wherein the wall is semi-circular, whereby the receiving space is opened laterally to permit lateral insertion of the drive pin.

* * * * *